United States Patent
Andersen (10) Patent No.: US 10,139,513 B2
(45) Date of Patent: Nov. 27, 2018

(54) DISTRIBUTED SEISMIC SOURCE ARRAY

(71) Applicant: GreenPowerUSA Inc., Chatsworth, CA (US)

(72) Inventor: James K Andersen, Woodland Hills, CA (US)

(73) Assignee: GREENPOWERUSA INC., Chatsworth, CA (US)

(*) Notice: Subject to any disclaimer, the term of this patent is extended or adjusted under 35 U.S.C. 154(b) by 35 days.

(21) Appl. No.: 14/857,778

(22) Filed: Sep. 17, 2015

(65) Prior Publication Data

US 2016/0084979 A1 Mar. 24, 2016

Related U.S. Application Data (60) Provisional application No. 62/052,979, filed on Sep. 19, 2014, provisional application No. 62/077,123, filed on Nov. 7, 2014, provisional application No. 62/104,025, filed on Jan. 15, 2015, provisional application No. 62/111,974, filed on Feb. 4, 2015, provisional application No. 62/159,820, filed on May 11, 2015, provisional application No. 62/182,805, filed on Jun. 22, 2015.

(51) Int. Cl.
 *G01V 1/40* (2006.01)
 *G01V 1/153* (2006.01)
 *G01V 1/52* (2006.01)

(52) U.S. Cl.
 CPC ............... *G01V 1/40* (2013.01); *G01V 1/153* (2013.01); *G01V 2001/526* (2013.01)

(58) Field of Classification Search
 CPC ...... G01V 1/40; G01V 1/42; G01V 2001/526; G01V 1/153
 USPC .............................. 367/25, 86; 181/102, 106
 See application file for complete search history.

(56) References Cited

U.S. PATENT DOCUMENTS

| | | | |
|---|---|---|---|
| 4,383,308 A | 5/1983 | Caldwell | |
| 4,632,212 A * | 12/1986 | Benzing | G01V 1/006 181/106 |
| 4,702,343 A * | 10/1987 | Paulsson | G01V 1/145 181/106 |
| 4,874,061 A | 10/1989 | Cole | |
| 4,899,844 A * | 2/1990 | Katahara | G01V 1/005 181/106 |
| 4,960,181 A * | 10/1990 | Marin | E21B 33/12 166/212 |
| 5,954,169 A | 9/1999 | Jensen | |
| 7,182,170 B1 * | 2/2007 | Brett | E21B 28/00 166/104 |

(Continued)

FOREIGN PATENT DOCUMENTS

GB    1193295 A    5/1970

OTHER PUBLICATIONS

PCT International Search Report and Written Opinion in PCT/US15/50824.

*Primary Examiner* — Ian J Lobo
(74) *Attorney, Agent, or Firm* — Roy L Anderson (57) ABSTRACT

A multitude of seismic sources are formed into a linear array which can be permanently cemented within a wellbore. The seismic sources can be orbital vibrators that are electrically connected and protected from the cementing by use of pieces of drill pipe and tubing that are interconnected and provide a container for electrical connection of the seismic sources and provide surface access through a surface vault.

9 Claims, 9 Drawing Sheets

(56) References Cited

U.S. PATENT DOCUMENTS

| | | |
|---|---|---|
| 2002/0104652 A1* | 8/2002 | Cole .................... E21B 31/005 |
| | | 166/249 |
| 2002/0171560 A1 | 11/2002 | Ciglenec |
| 2006/0096380 A1 | 5/2006 | Novascone |
| 2006/0131099 A1* | 6/2006 | Meynier ................ G01V 1/047 |
| | | 181/106 |
| 2008/0068928 A1 | 3/2008 | Duncan |
| 2009/0003131 A1 | 1/2009 | Meyer |
| 2011/0222368 A1 | 9/2011 | Fussell |
| 2012/0327742 A1 | 12/2012 | Kusko |
| 2013/0317630 A1 | 11/2013 | Schulz |
| 2013/0343156 A1 | 12/2013 | Horne |

\* cited by examiner

DISTRIBUTED SEISMIC SOURCE ARRAY

CROSS REFERENCE TO RELATED APPLICATIONS

This application is a non-provisional application that claims priority from the following provisional patent applications, the disclosures of each of which are specifically incorporated herein by reference: U.S. Ser. No. 62/052,979, filed Sep. 17, 2014; U.S. Ser. No. 62/077,123, filed Nov. 7, 2014; U.S. Ser. No. 62/104,025, filed Jan. 15, 2015; U.S. Ser. No. 62/111,974, filed Feb. 4, 2015; U.S. Ser. No. 82/159,820, filed May 11, 2015; and U.S. Ser. No. 62/182,805, filed Jun. 22, 2015.

FIELD OF THE INVENTION

The invention relates generally to downhole seismic sources that are used in conjunction with acoustic receivers for determining the lithology and for acoustic imaging of the subsurface of the earth.

BACKGROUND

Seismic sources are used to introduce controlled acoustic waves into the subsurface such that the direct and/or reflected waves can be defected by sensitive sensors at the surface or downhole. The detected energy is typically collected and processed and used to develop images of the subsurface. These subsurface images are regularly used by oilfield companies to locate, monitor, and enhance the recovery from subsurface oil & gas deposits.

In general, there are two types of seismic sources used for exploration and production in a land oilfield, those placed on the surface and those placed in the subsurface, i.e., downhole. The most widely used oilfield surface seismic source is the "vibroseis truck" which lowers a heavy plate onto the earth's surface which vibrates to radiate sound waves info the ground. The disadvantages of surface seismic sources such as the vibroseis truck include:
  limited frequency bandwidth
  relatively large size
  difficult to use in non-level, rocky, or muddy terrain
  high purchase price or high daily rental expense
  surface signal is attenuated and filtered by the relatively "lossy" near-surface layers
  can cause structural/vibrational damage to surroundings when used in populated areas Downhole sources were originally developed to get away from some of the problems associated with surface sources, but downhole sources introduced problems of their own, namely:
  limited power output (to prevent causing damage to well casings/cement bonds) thereby limiting transmission distance
  difficult to achieve good acoustic coupling once lowered into position downhole
  reliability issues associated with operating in rugged downhole environments that can include high temperatures and pressures
  high cost of downhole equipment
  not designed for permanent installation (most require periodic maintenance).

By an overwhelming percentage, the majority of onshore seismic surveys performed today employ surface seismic, that is, both the seismic sources and the seismic receivers are located at the surface. For improved image resolution, leading oil companies now agree that both the sources and receivers need to be closer to the reservoir, which means downhole.

Geophysicist's acknowledge that they experience as much as a 99 percent attenuation of the energy produced by surface sources (i.e., vibroseis trucks) as it passes through the unconsolidated near surface (top 100-200 feet) layers, "Bypassing the attenuation of the near-surface layer can reduce the power needed by two to three orders of magnitude, i.e., 30-300 kW for a surface source to ~300 W for a downhole source," (ref: P. C. Leary and L. A. Walter—Geophysical Journal International, August 2005). In addition, the near surface layers absorb much of the higher frequency signals, limiting their useful frequencies to approximately 50 Hz and below. At 200 Hz, GPUSA's non-impulsive or distributed energy downhole seismic source can quadruple the spatial/temporal resolution, based upon a 4× increase (50 Hz to 200 Hz) in received frequency.

Current downhole seismic sources are typically deployed via wireline into a wellbore as a single element, and are designed to be moved to multiple locations within the wellbore, as needed for a particular seismic survey. At each location, the source is typically clamped inside the wellbore prior to activation of the seismic source to achieve good coupling with the earth for best performance. Alternatively, the source can hang freely within the wellbore (i.e., fluid coupled) but transmission beyond the wellbore will be somewhat degraded. Each time a survey is performed, a wireline truck and crew is required at a significant expense. The major advantage of using downhole sources and sensors (as compared to surface seismic) is much higher resolution of the subsurface lithology.

SUMMARY OF THE INVENTION

The present invention is generally directed to using multiple seismic sources held within a linear array and it is especially preferred that the seismic sources are orbital vibrators which have a primary acoustic radiation pattern which is orthogonal to a wellbore.

The linear array may be cemented within the wellbore (and the cementing process can benefit from energizing the linear array during said process) or if may be secured within the wellbore by low friction rollers while a radial clamping force (such as a spring force) maintains the plurality of low friction rollers against sides of the wellbore.

The linear array of orbital vibrators (which can include two or more orbital vibrators co-located at each location in the linear array) can be held within drill pipe and tubing or interconnected strengthened cable and the linear array is connected inside a protected structure at or near the surface of the wellhead where a separable topside electronics unit provides power, control electronics, timing, as well as a means for synchronization with at least one other oilfield system used in conjunction with the linear array in a seismic survey. Topside electronics can include an AC generator which is used to provide a true, clean sinusoidal variable frequency signal to the linear array orbital vibrators.

Accordingly, it is an object of the present invention to provide improved seismic sources that are used in conjunction with acoustic receivers for determining the lithology and for acoustic imaging of the subsurface of the earth.

This and further objects and advantages will be apparent to those skilled in the art in connection with the drawings and the detailed description of the invention set forth below.

BRIEF DESCRIPTION OF THE DRAWINGS

FIG. 1 illustrates a typical ORBITAL VIBRATOR DSS array in accordance with the present invention cemented inside a wellbore while

FIG. 11 illustrates an ORBITAL VIBRATOR DSS placed inside a cylindrical vessel filled with an appropriate acoustic coupling to reduce cavitation while

FIG. 13 illustrates an ORBITAL VIBRATOR DSS system in accordance with the present invention modified by placing two single axis orbital vibrators on a rigid frame with each turning in the opposite direction while

FIG. 17 illustrates the eccentric mass of an orbital vibrator at rest according to the present invention while

DETAILED DESCRIPTION OF THE INVENTION

The present invention, referred to here as a Distributed Seismic Source (ORBITAL VIBRATOR DSS), is generally directed to improved equipment and methods for the deployment of downhole seismic sources that eliminate disadvantages associated with the current state-of-the-art surface and subsurface seismic sources. Because an understanding of the prior invention will prove useful, this disclosure will first set forth how ORBITAL VIBRATOR DSS can be used in land applications and only then explain how it can be adapted to marine seismic applications.

In general the present invention uses linear arrays 1 of downhole vibratory seismic sources 1A interconnected and deployed via drill pipe/tubing or high strength flexible cable.

When using drill pipe/tubing the drill pipe/tubing encloses both the individual seismic sources and the power/control cables, protecting them from being damaged in the downhole environment. The drill pipe/tubing also provides the mechanical strength (in tension) holding the downhole system together such that the power/control cables see minimal tension during installation and operation. Using drill pipe/tubing has many advantages because it is standard equipment used every day in the oilfield; it is designed for the downhole environment. It is inexpensive, and it is readily available.

Figure 1:
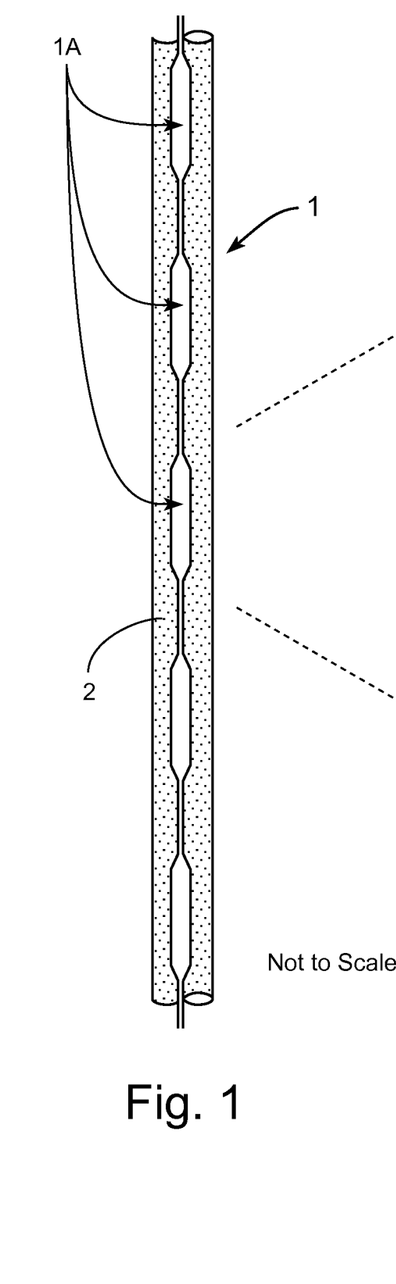
Figure 1A:
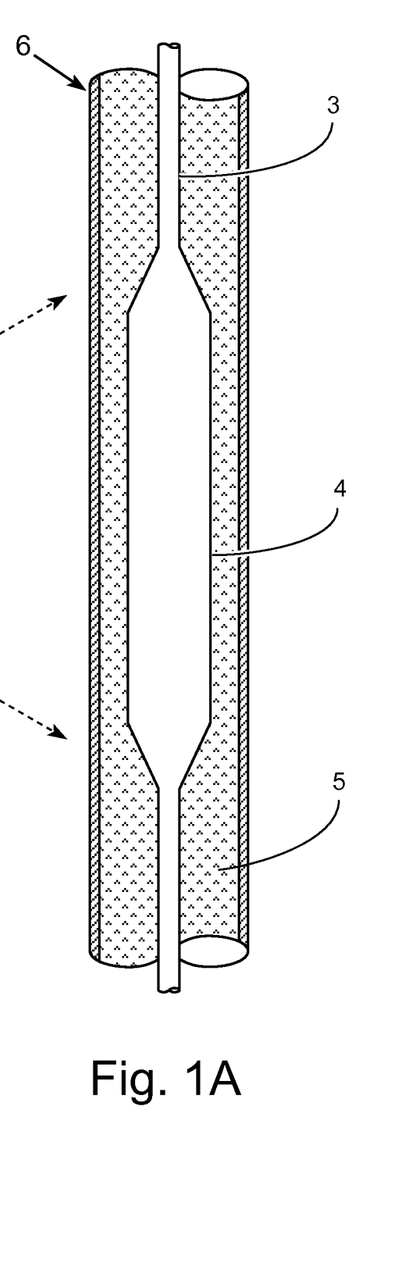
FIG. 1A is a blown-up illustration of one source within the ORBITAL VIBRATOR DSS of FIG. 1.
Figure 2:
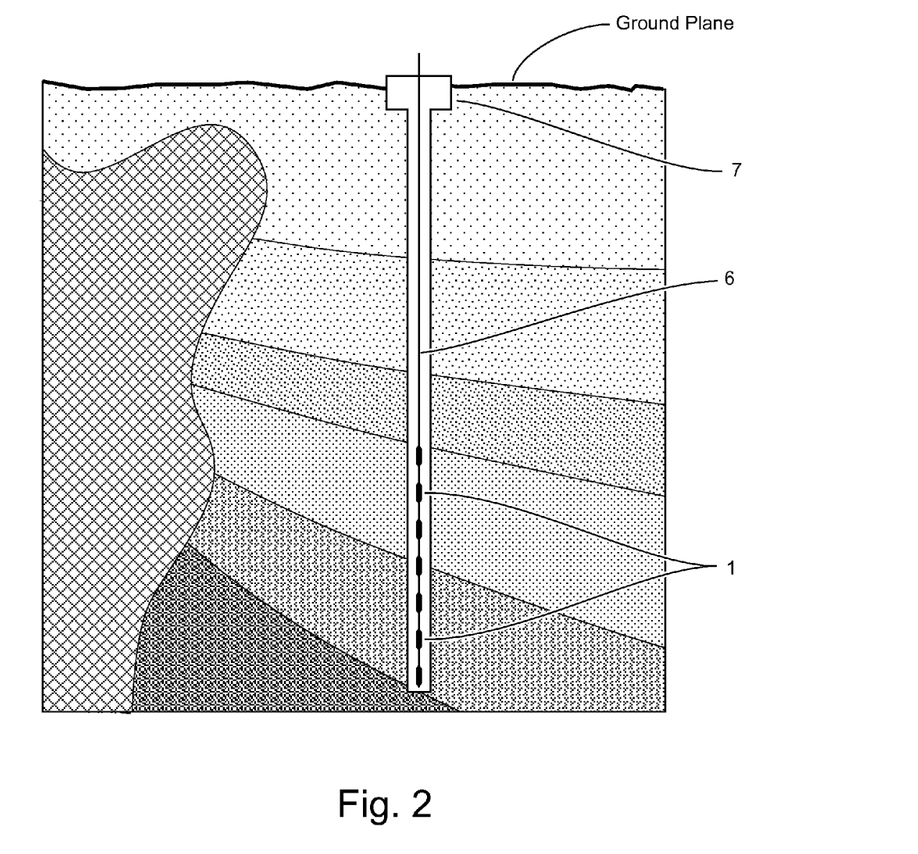
FIG. 2 illustrates an ORBITAL VIBRATOR DSS array employed inside a vertical wellbore.
Figure 3:
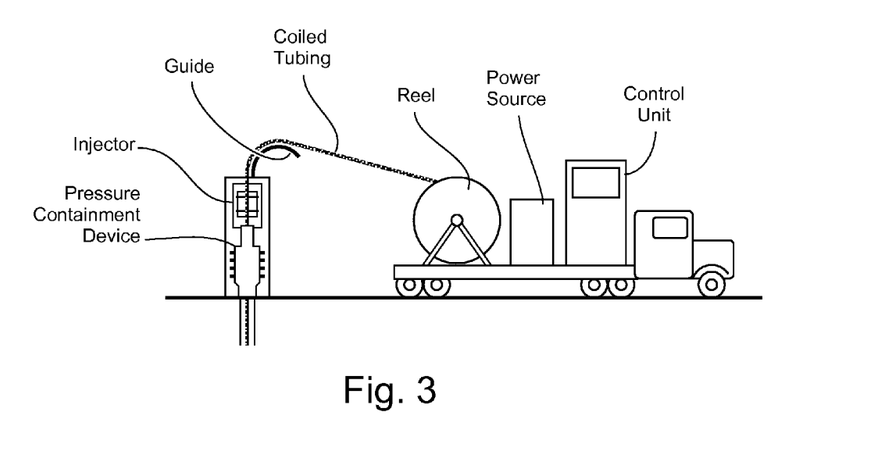
FIGS. 3, 3A and 3B illustrate an ORBITAL VIBRATOR DSS array employed inside either a vertical wellbore (FIG. 3A) or a horizontal wellbore (FIG. 3B) and how it might be inserted through use of a coiled tubing rig (FIG. 3).
Figure 3A:
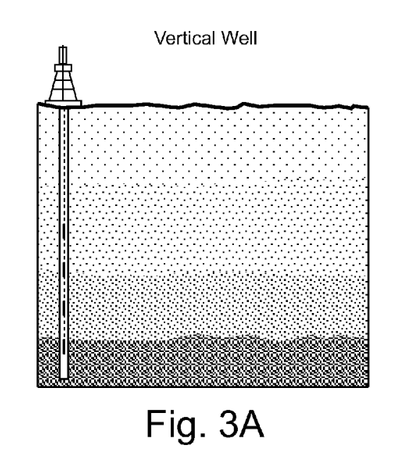
Figure 3B:
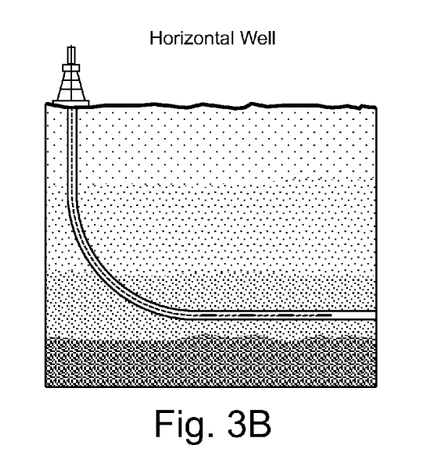

In accordance with the present invention, it is envisioned that the ORBITAL VIBRATOR DSS can be permanently cemented in either a cased or uncased hole as shown in FIG. 1A where downhole well 6 has been filled with cement 5. A surface vault 7 provides access to a connector at or near the top of the wellbore as well as protection when it is not in use. To activate the installed ORBITAL VIBRATOR DSS system, a separate power/control electronics chassis is connected to the ORBITAL VIBRATOR DSS system via the connector in the surface vault. It is envisioned that the outside diameter of a cable section 3 of the drill pipe/tubing can vary from approximately 1 inch to approximately 2 inches. It is envisioned that the outside diameter of an individual seismic source section 4 can vary from approximately 1 inch to approximately 5 inches.

Seismic surveys are increasingly being used in the today's oilfield for monitoring/enhancing production vs. exploration. As such, there will be an increased demand for both permanent seismic sources and sensors. This will allow operators to perform seismic surveys on demand without the need to call in outside resources. And it will provide much more detailed understanding of the subsurface leading to a significantly higher percentage of oil & gas extracted.

In an especially preferred embodiment of the present invention, an orbital vibrator is used as the downhole source 1A. Although there are many variants, an orbital vibrator basically consists of a drive motor with unbalanced weight (s) on its shaft causing it to vibrate when the drive motor is energized. As the speed of the drive motor increases, the frequency of the vibrations increases. For this application, the frequency can be designed to ramp up over time, ramp down over time, combined ramp up/down, or be held at a constant frequency (i.e., at frequency that provides the best performance for a given subsurface structure). There are many examples in the prior art regarding the use of orbital vibrators as downhole sources.

Because the preferred embodiment calls for the ORBITAL VIBRATOR DBS to be permanently installed, it is envisioned that the ORBITAL VIBRATOR DSS will be installed in instrumentation, observation, or wells previously used for production that are no longer producing.

The present invention includes, but is not limited to, the following combinations of equipment and/or methods:

1. A multitude of seismic sources forming a linear array, designed to be permanently deployed in a wellbore.

2. A multitude of seismic sources forming a linear array, designed to be permanently deployed in a wellbore where the seismic sources consist of orbital vibrators.

3. A multitude of seismic sources forming a linear array, designed to be permanently deployed in a wellbore where the individual seismic sources are connected via drill pipe/tubing.

4. A multitude of seismic sources forming a linear array, designed to be permanently deployed in a wellbore, where the individual seismic sources are connected via drill pipe/tubing and all wiring is protected inside the drill pipe/tubing.

5. A multitude of seismic sources forming a linear array, designed to be permanently deployed in a wellbore where the drill pipe/tubing is in separable sections with all wires/cables inside.

6. A multitude of seismic sources forming a linear array, designed to be permanently deployed in a wellbore where separable sections of drill pipe/tubing is used for deep wells to connect the top of the seismic source array to the surface connection.

7. A multitude of seismic sources forming a linear array, designed to foe permanently deployed in a wellbore, with a surface connection inside a protected case or vault at the surface.

8. A multitude of seismic sources forming a linear array, designed to be permanently deployed in a wellbore with a separable topside electronics unit that provides power, control electronics, timing, as well as a means for synchronization with other oilfield systems being used in conjunction such as data recorders and processing equipment.

9. A multitude of seismic sources forming a linear array, designed to be permanently deployed in a wellbore where the array is cemented inside the wellbore.

10. A multitude of seismic sources forming a linear array, designed to be permanently deployed in a wellbore where the sections of drill pipe/tubing are designed to be coupled together during the installation process with water tight, pressure proof connections 11. A multitude of seismic sources forming a linear array, designed to be permanently deployed in a wellbore where the wires/cables inside the sections of drill pipe/tubing are designed to be permanently joined (using an insulated swaged connection, for example) during installation prior to the coupling of the drill pipe/tubing sections.

12. A multitude of seismic sources forming a linear array, designed to be permanently deployed in a wellbore, and designed to operate at elevated downhole temperatures, i.e., 150 degrees Celsius and higher.

13. A multitude of seismic sources forming a linear array, designed to be permanently deployed in a wellbore where the separable sections of drill pipe/tubing used for interconnection between the individual sources and/or to connect the top of the seismic source array to the surface connection is made of a metal/metal alloy.

14. A multitude of seismic sources forming a linear array, designed to be permanently deployed in a wellborn the separable sections of drill pipe/tubing used for interconnection between the individual sources and/or to connect the top of the seismic source array to the surface connection is made of a plastic material.

15. A multitude of seismic sources forming a linear array, designed to be permanently deployed in a wellbore the separable sections of drill pipe/tubing used for interconnection between the individual sources and/or to connect the top of the seismic source array to the surface connection is made of a reinforced composite material.

16. A multitude of seismic sources forming a linear array, designed to be permanently deployed in a wellbore where the seismic sources consist of orbital vibrators driven by brushless DC motors.

17. A multitude of seismic sources forming a linear array, designed to be permanently deployed in a wellbore where the seismic sources consist of orbital vibrators powered by a compressed gas.

18. A multitude of seismic sources forming a linear array, designed to be permanently deployed in a wellbore where the seismic sources consist of orbital vibrators powered by an AC or DC electric motor.

19. A multitude of seismic sources forming a linear array, designed to be permanently deployed in a wellbore where the seismic sources consist of orbital vibrators powered by hydraulics.

20. A multitude of seismic sources forming a linear array, designed to be permanently deployed in a wellbore where coiled tubing (with all wires inside) is used for deep wells to connect the top of the seismic source array to the surface connection, and can be used to provide a means for pushing the array for horizontal well applications.

21. A multitude of seismic sources forming a linear array, designed to be permanently deployed in a wellbore where the drill pipe/tubing sections are connected via a flexible joint with ail wires/cables inside.

22. A multitude of seismic sources forming a linear array, designed to be deployed in a wellbore on a temporary basis where the drill pipe, tubing, and/or coiled tubing (with wires inside) provide the means for insertion and extraction.

23. A multitude of seismic sources forming a linear array, designed to be permanently deployed in a wellbore where the seismic sources consist of linear vibrators.

24. A multitude of seismic sources forming a linear array, designed to be permanently deployed in a wellbore where the seismic sources consist of orbital vibrators driven by a brushless DC motor with either a sensor less or a sensor type (e.g., Hall Effect Sensor) controller.

25. A multitude of seismic sources forming a linear array, designed to be permanently deployed in a wellbore, where the seismic sources are mounted inside pressure-proof piping/tubing.

The invention will now be further described in connection with an alternative embodiment.

A traditional method of deploying tools into a wellbore is via an armored cable. The armor surrounds the insulated conductors and or optical fibers, providing physical protection to the interior elements as well as longitudinal strength in tension. The armor is typically made of multiple strands of solid steel wire wrapped around the cable core with a lay angle that is consistent with the bend radius of the cable. The armor can be in a single layer or in multiple layers to provide specific performance features, however, those performance features are beyond the scope of the discussion at hand. So, the additional embodiment is added: A multitude of seismic sources forming an array, designed to be permanently deployed in wellbore(s) where the connecting element 3 between the individual sources 4 is an armored cable and the connecting element 6 between the top of the seismic source/array to the surface is also an armored cable. It also includes a means of connecting the armored cable to the individual seismic sources via a termination that captures the armor to provide a pull-out strength approximately equal to the breaking strength of the armored cable as well as a water-tight and pressure proof connection to the seismic source housing. (Alternatively, rather than using such an armored cable, a high strength cable can be used in the same way, and also in non-permanent deployments).

Rotary vibrators are used to consolidate freshly placed concrete by helping entrapped air to escape. As the concrete subsides, large air voids between coarse aggregate particles fill with mortar. This consolidation enhances the concrete's performance, i.e., the concrete's density, strength, and the bond with reinforcing steel are improved.

In the oilfield business, getting a good cement job is difficult. An additional claim of the present invention is that we can energize our downhole vibrator during the cementing process to ensure a good cement job; good compaction, elimination of air gaps, uniform density, good bonding between our source's outer body and the cement, and good bonding between the cement and the borehole walls.

Figure 4:
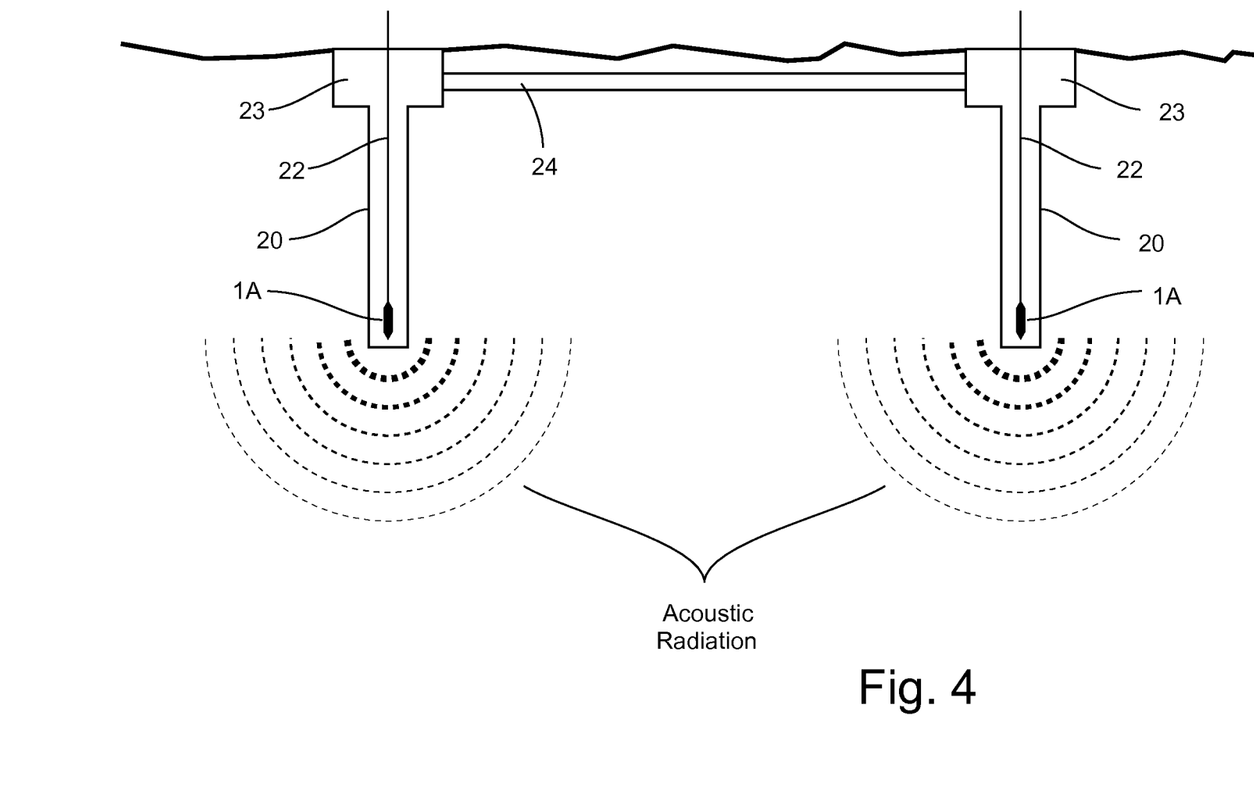
FIG. 4 illustrates an alternative invention in which a single ORBITAL VIBRATOR DSS source (configured as shown in FIG. 13) is located at the bottom of one or more shallow wells to focus acoustic radiation downwardly into the earth from the bottom of the well(s).

In addition to the foregoing disclosure, it is also possible to create an array of multiple wells in which a single downhole vibratory seismic source is positioned at the bottom of each well so as to direct acoustic radiation downwardly from the bottom of the well into the earth as is illustrated in FIG. 4. Such wells can include shallow holes in the ground (on the order of 20 feet or less) with the source placed at the bottom and refilled with earth. Such wells can be arranged in patterns, such as an X or a cross, in which a single downhole vibratory seismic source 1A is placed in a shallow hole (which can be dug without the need for expensive equipment) 20 and then power/control cables 22 are brought up to a shallow vault 23 which can be connected by trenches 24 with other vaults, one or more of which may contain electronics for controlling the entire array (but each seismic source 1A will not necessarily need its own electronics).

Figure 13:
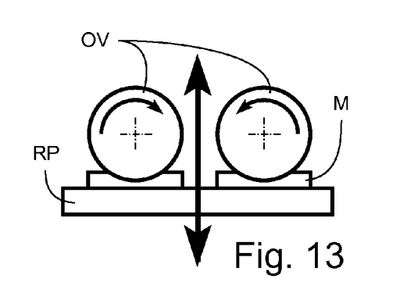

The orbital vibrators described so far have a primary acoustic radiation pattern that is orthogonal or perpendicular to the wellbore in which it is installed. In some applications it is desired to have acoustic energy from the source radiate in a direction downwardly from a bottom of a wellbore in which it is installed. In such an embodiment, as illustrated in FIG. 4, using orbital vibrators configured as in FIG. 13 where the primary direction of the useful energy generated by the source will be downwardly from the bottom of the well into the earth (which is ninety degrees different in direction from a previously described ORBITAL VIBRATOR DSS array put in a well).

Of course, should it be desired, a single seismic source located in a bottom of a well (or a series of wells) might be oriented so as to generate a radiation pattern that is perpendicular to the wellbore, instead of being directed ninety degrees differently in a direction heading into the earth away from the well (and the ground surface).

The acoustic sources described above may include orbital vibrators, combinations of orbital vibrators that when combined provide a desired directionality, or electromagnetic vibrators.

The invention will now be further updated by the following additional information. This addition includes the following:

- Additional means for deploying and establishing good coupling of the source(s) to the well bore/earth without the use cement.
- A downhole clamping method that allows the sources to be lowered into the well with the clamps retracted, and once the sources are in the desired position, activating the clamps via the vibration of the source.
- Co-locating two or more vibrational sources at each location, each with a different frequency range.
- Locating the control electronics at or near the surface of the wellbore along with a means for wirelessly controlling their operation.
- Use of a non-armored cable, for example a cable with a polymer strength member such as Kevlar, Vectran, or aramid fiber.

BACKGROUND/SUPPORTING INFORMATION

To ensure that the maximum amount of acoustic/vibrational energy generated in the downhole source is transmitted into the earth, good acoustic coupling between the source and the wellbore is desired. Cementing the source(s) in the wellbore provides excellent coupling, however, the well becomes essentially plugged rendering it unusable for other purposes, and the equipment, being permanently installed cannot be repaired or reused in another well. For these reasons, some users may prefer the system not be cemented.

Passive clamps are widely used (such as bow springs or magnets); however, since they are always "on" their clamping force is relatively low to allow them to slide down the wellbore during deployment.

The source(s) can hang freely in the fluid column of the well when the source is energized causing the energy to be transmitted to the fluid and then to the well casing. This does not provide as much coupling efficiency as the cement; however, the source(s) are retrievable.

Figure 5:
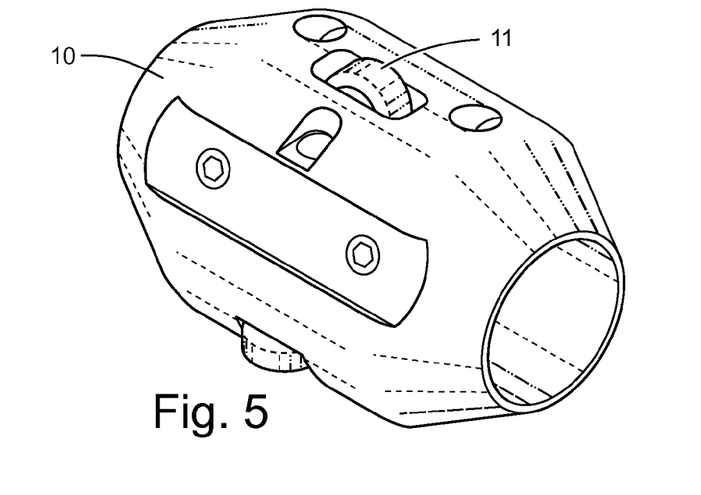
FIGS. 5 and 5A illustrate an example tubing centralizers that incorporate rollers that an ORBITAL VIBRATOR DSS can be placed inside to allow it to move inside a wellbore with lo friction while also providing good acoustic coupling to the wellbore.
Figure 5A:
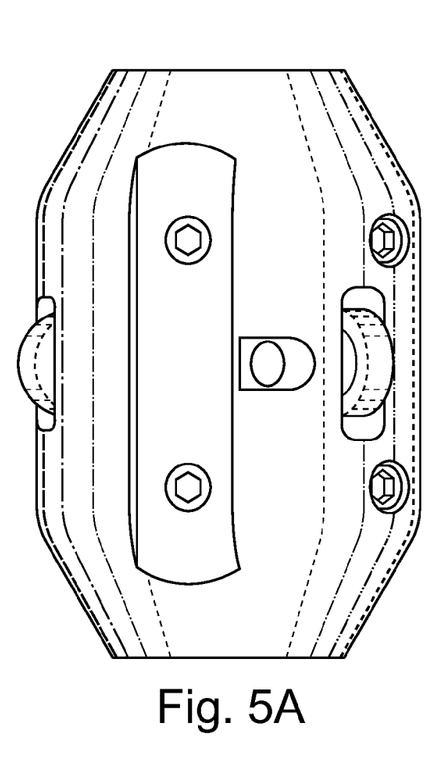

Another means proposed here is a more novel passive clamping system for the distributed seismic source (ORBITAL VIBRATOR DSS). The ORBITAL VIBRATOR DSS is unique in that it generates acoustic energy in the radial direction only, with virtually no energy in the longitudinal direction of the wellbore. Because traditional downhole sources generate energy in all directions and traditional downhole sensors defect energy in all three axes (i.e., x, y, z) they require clamps that are rigid in all three axes. The ORBITAL VIBRATOR DSS requires the clamp be rigid in the radial direction only. Because the ORBITAL VIBRATOR DSS clamp requires no rigidity in the longitudinal direction, it can employ low friction rollers to allow the ORBITAL VIBRATOR DSS to more easily slide in the borehole (i.e., during deployment and retrieval) while still providing a high radial clamping force. The clamp can be similar to tubing centralizers (see FIG. 5) that incorporate rollers to centralize production tubing for example, inside a larger well casing.

The passive ORBITAL VIBRATOR DSS clamps may also incorporate some kind of spring force that maintains the rollers against sides of the wellbore. The force should be high enough to remain stiff under the vibratory forces imparted from the source to the wellbore. The spring force also serves to maintain contact with the wellbore due to variations in wellbore diameter. Methods to adjust the passive clamps to fit various well diameters are also envisioned. The low friction rollers can incorporate ball bearings, needle bearings, or any other kind bearing that provides low rolling friction.

Another alternative approach is to combine the rollers with a downhole activated mechanical means to clamp each of the sources to the wellbore. (Using rollers to contact the wellbore upon activation prevents them from becoming stuck in the well, which is a large problem with clamping arms that engage directly against the wellbore.) In this case, the seismic sources are lowered info the well in the unclamped position (allows them to move freely) and clamped once they are at the desired depth. For example, pipe clamps or an equivalent can be used to keep the spring force that maintains the rollers against sides of the wellbore compressed until a source is inserted into the wellbore and once the source is inserted, the pipe clamp or its equivalent can be removed. Mechanically activated clamps are usually very complicated, i.e., requiring additional power, electronics, motors and/or hydraulics. This embodiment requires no additional active downhole electronics or motors. It engages the clamps passively, i.e., simply energizing the source creates strong vibrational forces causing the clamps to "unlock" thereby coupling them to the wellbore. Whereas it is difficult to "push" the array down a wellbore even with minimal friction (i.e., requires sinker weight bars) it is relatively easy to pull an array out if it employs low friction rollers. It essentially provides improved acoustic coupling while allowing the ability to redeploy/remove to other depths or to other wells.

The forces generated by an orbital vibrator are proportional to the rotating mass, the distance the mass is from the centerline (i.e., the eccentricity) and the square of rotational speed. Thus at lower speeds, the force generated is relatively low and increases exponentially as rotational speed increases. One method to improve the overall performance is to place two or more orbital vibrators at each location. By varying the speed, mass, eccentricity or all of the above, each orbital vibrator can provide optimum output at a different frequency range.

An ORBITAL VIBRATOR DSS complete with control electronics can be installed at each wellhead at or near the surface exit point. A means of remote wireless activation can be added to allow activation from another location, or from anywhere around the world via an internet connection. This will allow operators to conduct seismic surveys without having to leave the office.

In addition to using an armored cable for interconnection between the individual ORBITAL VIBRATOR DSS sources or to connect the top of the ORBITAL VIBRATOR DSS array to the surface, a cable with synthetic strength members can be used. The possible synthetic strength member materials include Vectran, Kevlar, aramid fiber or any other suitable high strength material.

A further addition to the above disclosure is a unique method of providing a frequency variable sinusoidal (3 phase) signal to drive a downhole source that may be 1000 or more feet away from the surface electronics. It allows speed control of a three phase induction motor without sending a PWM AC signal through a long downhole cable.

One of the downhole sources used in the ORBITAL VIBRATOR DSS is an orbital vibrator. The orbital vibrator consists of a motor (typically an AC electric 3 phase induction motor) that spins an off-center or eccentric weight resulting in vibration (the speed of the motor determines the frequency of the vibration). The speed of the AC motor is related to the frequency of the supplied AC voltage. The formula for calculating the speed of an AC synchronous motor is:

$$\text{Synchronous Speed} = 120 * \text{Frequency}/\text{Number of Poles}$$

The speed of an AC induction motor is always slightly lower than the synchronous speed, with the difference being called slip. The point is that one can control the speed of an AC motor by varying the frequency of the supplied AC voltage. Many companies build devices called Variable Frequency Drives (VFDs) that allow them to take standard 50/60 Hz AC power as input, and provide an adjustable variable frequency output to control the speed of an AC motor. Most VFDs are designed for use with 3 phase induction motors.

Figure 6:
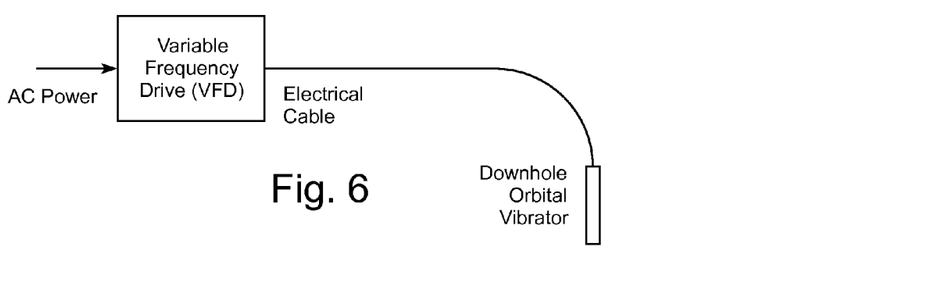
FIG. 6 illustrates a typical system that might be used to drive a downhole orbital vibrator.

FIG. 6 shows a typical system that could be used to drive a downhole orbital vibrator. For this example, 240V or 480V three phase 80 Hz power is supplied to the VFD. The VFD converts the fixed 60 Hz input into a 240/480V variable frequency output signal, typically with a range from 0 to about 600 Hz.

There are many reasons why this is not ideal for a downhole application, a few are provided here. Most VFDs specify a maximum distance (typically 100 feet or so) between the VFD and the motor that is being controlled. The reason for this limit is because the output of a VFD is not a true sine wave but rather a pulse width modulation (PWM) approximating a sine wave (see FIG. 7).

Figure 7:
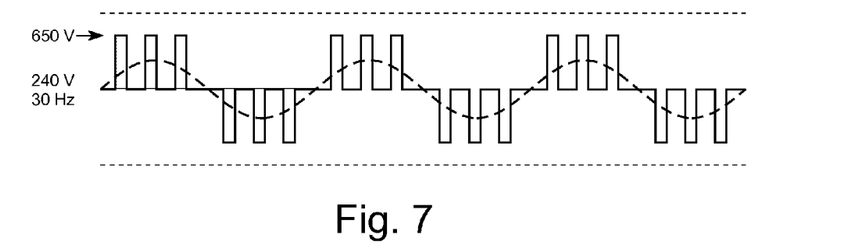
FIG. 7 illustrates that the output of a variable frequency driver is not a true sine wave.

As the distance from the VFD increases, the PWM signal can become corrupted. This distance limit is acceptable for most industrial applications, however, for the downhole vibrator application, the separation distance can be 1000 feet or more. Various electronic modifications can be made to the downhole vibrator unit to minimize the effect described above; however, they add cost/complexity and do not completely eliminate the problem. Another feature of a PWM signal is that the voltage pulses can be significantly higher than the 240/480 modulated sine wave. Thus for the downhole application, the downhole cable and the downhole electric motor insulation would have to be rated for up to 1000 volts even though they will be running at 240/480 volts. This adds complexity, expense, and reduces reliability, another negative for the downhole application.

Figure 8:
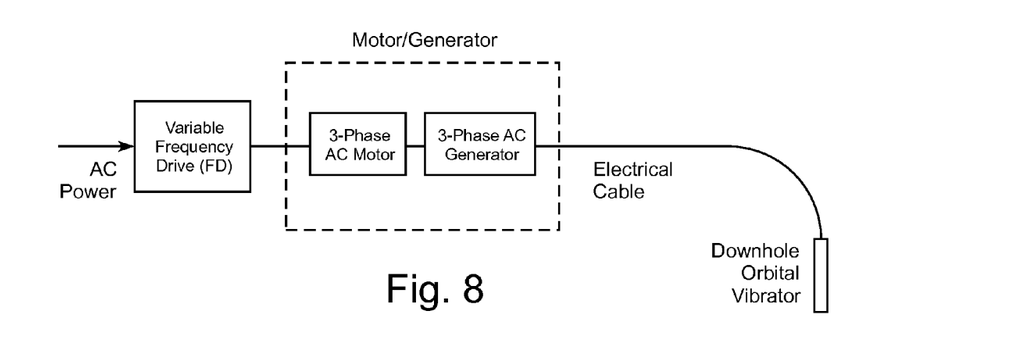
FIG. 8 illustrates an alternative in which a generator used in accordance with the present invention produces a true sine wave output that does not degrade with distance and is free of high voltage pulses.

An alternative that eliminates the problems described above is depicted in FIG. 8. In this case the VFD drives a 3 phase induction motor mounted in very close proximity. The 3 phase AC motor is directly coupled to a 3 phase AC generator. In this case, the VFD controls the speed of the motor which in turn controls the speed of the generator. The generator produces a true sine wave output (variable frequency) that does not degrade with distance and is free of the high voltage pulses.

The key here is providing a true, clean sinusoidal variable frequency signal to the downhole orbital vibrator via the use of an AC generator. The means to drive and control the speed of the AC generator are numerous and not necessarily limited to the use of a VFD/AC induction motor.

Now that Applicant's ORBITAL VIBRATOR DSS applications for land have been set forth, its adaptation to marine seismic applications will be disclosed. The advantages of ORBITAL VIBRATOR DSS are also tremendous for the marine seismic application. Currently, there is a large ongoing development effort within the marine seismic industry to replace the existing "airgun" marine seismic source with a "marine vibrator". Like the downhole sparker source, the airgun is an impulsive source releasing a very large amount of energy over a short period of time (fractions of a second) which can harm marine life. And like a sparker, its output is typically highly non-linear, and substantially non-reproducible. It is thought that by using a marine vibrator the source energy can be distributed over an extended period of time (many seconds) such that the total energy may be equivalent but the peak is reduced thereby making it less harmful to marine life.

The current marine vibrator technology being pursued by companies like PGS, GeoKinetics, and others are large, complicated, expensive, and unreliable.

Figure 9:
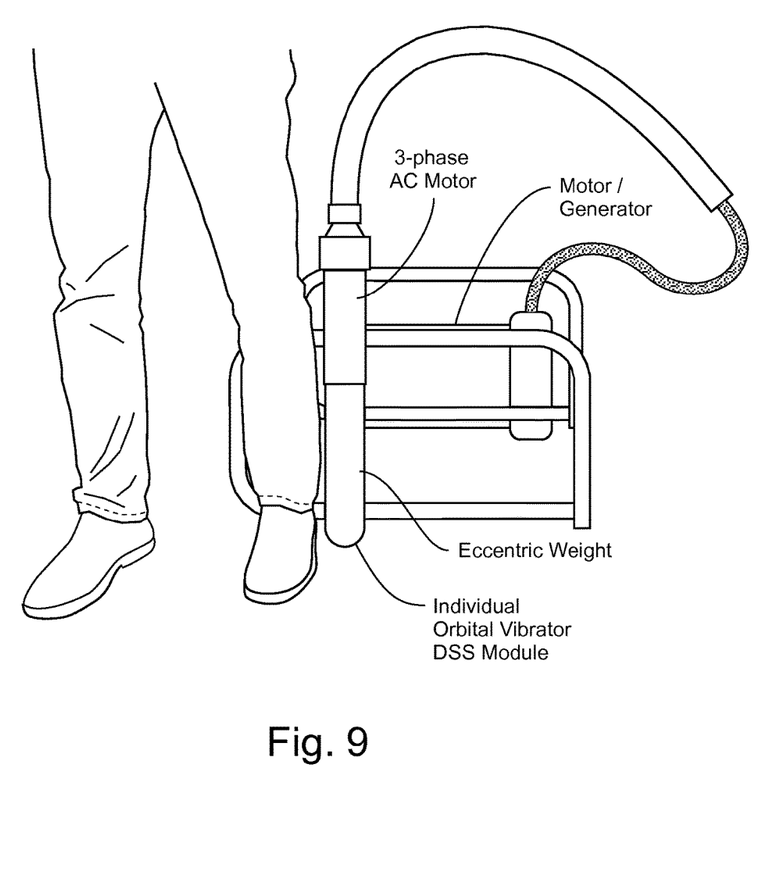
FIG. 9 illustrates a preferred embodiment of the present invention useful in marine seismic applications.
Figure 10:
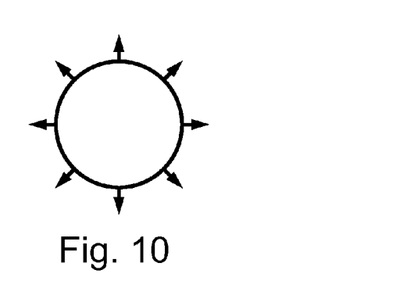
FIG. 10 illustrates an ORBITAL VIBRATOR DSS as rotating point source radiating energy omnidirectionally.
Figure 11:
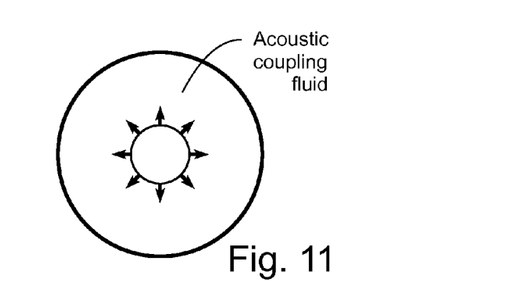

In accordance with the present invention, a The GPUSA marine vibrator solution (using orbital vibrators as the source) is small, reliable, simple, and inexpensive. The photo in FIG. 9 shows an orbital vibrator along with the motor generator set used to provide a clean variable frequency AC drive signal to the source module in accordance with the present invention (hereinafter referred to as "the GPUSA orbital vibrator solution"). The GPUSA orbital vibrator solution produces useable vibratory signals from 30 Hz to 200 Hz. The main difference is that rather than being placed in a well, for this application it is placed in a body of water such as the Gulf of Mexico, North Sea or any other body of water where subsea oil may be present. It radiates acoustic energy into the water that penetrates the sea bottom which is then reflected back to receivers located either on the sea bottom or in the sea itself. These reflections are used to generate images of the subsea surface. In addition to all of our previously mentioned claims/benefits, some possible additional configurations are described below:

1. Monopole projector design. The existing ORBITAL VIBRATOR DSS uses an electric motor coupled to an eccentric weight on the same longitudinal axis. In open water, (similar to a well filled with water) it acts like a rotating point source radiating energy equally in all directions (omnidirectional) as illustrated in FIG. 10. Because of the small size of the ORBITAL VIBRATOR DSS (outside diameter approximately 2.6 inches) and its high output power, it may experience cavitation at the outer surface that is in contact with the surrounding water. Cavitation effects include potential erosion of the outer surface of the projector/source, and a loss of acoustic power transmitted into the water due to absorption and scattering by the cavitation bubble cloud. The cavitation threshold is a function of the energy intensity of the source per unit area (i.e., watts per square inch) and the ambient water pressure. For a given amount of power, the cavitation threshold may be increased by increasing the ambient pressure (deeper depth) or increasing the surface area (reducing the energy intensity), or both. In the case of the ORBITAL VIBRATOR DSS, it can be placed inside a cylindrical vessel filled with an appropriate acoustic coupling fluid (preferably with a higher cavitation threshold than water; see FIG. 11) such that the energy intensity at the outer surface of the source/projector is below the cavitation threshold. Such acoustic coupling fluids are well known within the sonar industry. If needed, the pressure of the acoustic coupling fluid inside the cylindrical vessel may be increased also.

Figure 12:
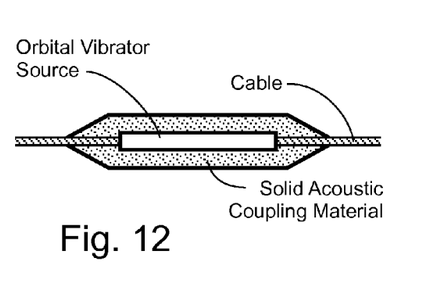
FIG. 12 illustrates a solid acoustic coupling material that serves the same function.

Alternatively, the ORBITAL VIBRATOR DSS can be covered with a solid acoustic coupling material that serves the same function (see FIG. 12). The acoustic coupling may be cast/molded over the ORBITAL VIBRATOR DSS or it may be split and bolted and/or adhesively bonded to the ORBITAL VIBRATOR DSS. The two primary desired properties of the solid acoustic coupling material are that if provide a good acoustic match with the surrounding seawater to maximize transmission efficiency and that if provide adequate heat transfer to the surrounding seawater to allow heat generated by the ORBITAL VIBRATOR DSS to be dissipated. Such acoustic coupling materials are well known within the sonar industry.

Cavitation issues in the dipole and half dipole designs described below may be handled in similar ways.

2. Dipole projector design. The existing ORBITAL VIBRATOR DSS system can be modified by placing two single axis orbital vibrators OV on a rigid plate/frame RF by mounting M with each turning in the opposite direction (see FIG. 13). In this case the omnidirectional energy from each vibrator cancels out with the exception of the linear motion. The resultant energy will radiate in only two directions (i.e. dipole).

Figure 14:
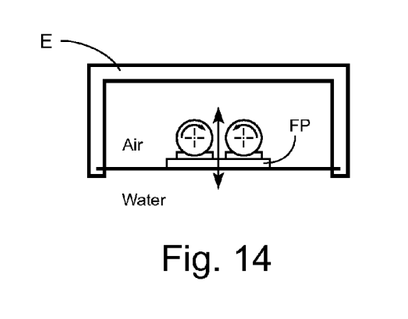
FIG. 14 shows a modified version in which the two single axis orbital vibrators can be mounted on an interior surface of an air-filled box such that vibration is imparted in one direction.

3. Half dipole projector design. For some applications it is desired to have the energy radiate in one direction only. In this case the two single axis orbital vibrators OV from the dipole design can be mounted to a flexing plate FP on the inside of an otherwise stiff, air filled enclosure E (see FIG. 14). Here the linear motion will cause the plate it is mounted on to move up and down, imparting the energy info the wafer in one direction only.

Possible Means of Deployment.

Figure 15:
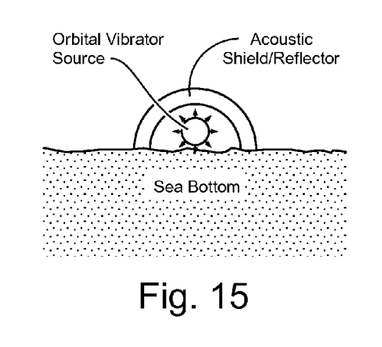
FIG. 15 illustrates an ORBITAL VIBRATOR DSS deployed on a sea bottom.

The marine ORBITAL VIBRATOR DSS array can be towed behind a ship, tethered from an offshore oil platform at a depths anywhere from just below the surface to the sea bottom, or it can be trenched (buried) beneath the sea floor (see FIG. 15). If placed on the sea floor bottom a cover may be placed over the ORBITAL VIBRATOR DSS (omni or dipole versions) to direct the acoustic energy into the sea bottom and limit acoustic energy from entering the seawater above (minimizing harm to sea creatures).

If can also be placed in subsea horizontal or vertical wells which have the added advantages of no loss of energy at the water/seafloor interface and no radiation info the seawater thereby completely eliminating possible harm to marine life.

The half dipole projector can be placed on the sea floor directing all energy into the ocean bottom for maximum efficiency and minimal radiation in the seawater above minimizing possible harm to marine life.

In the case where it is tethered to an offshore oil platform, the other end can be attached to a small craft such that if can be easily repositioned (rotated) during a seismic survey. It can also be positioned (tethered) between two boats. For the towed application, tow depth can be maintained by flotation devices, depth control birds, or similar means. The half dipole projector may also be mounted to the underside of a boat with the source projecting energy downward.

Finally, in view of the above disclosure re marine seismic applications, additional modifications can be made to my prior disclosures re land applications. More particularly, whereas previously I have focused on the array being permanently installed in a wellbore, there are substantial applications for it to be temporarily installed, i.e., be retrievable, e.g., a multitude of seismic sources forming a linear array, designed to be non-permanently deployed in a wellbore where the seismic sources consist of orbital vibrators and a multitude of seismic sources forming a linear array, designed to be non-permanently deployed in a wellbore where the seismic sources consist of orbital vibrators powered by a three phase AC motor.

I have also determined that the downhole array does not have to be clamped, but can be fluid coupled inside the wellbore. In other words, the vibrator imparts an acoustic wave in the borehole fluid and the acoustic wave front travels radially to the borehole wall and exits as seismic waves.

I have added a monitoring accelerometer in each source module that tells the operator exactly what the source is putting out (and records it as well) so that the data (which includes data about the spectrum and amplitude of acoustic radiation output the seismic source) can be used during post processing (correlation processing, deconvolution, etc.) of the data received by the seismic sensors (not ours). More particularly, a digital monitoring accel is placed inside the pressure housing of the vibrator. The digital signal is sent via twisted pair wires inside the array cable to the surface where it is stored/recorded. The data is also displayed in near real time to the operator providing confirmation of the vibrator output.

The preferred embodiment of the ORBITAL VIBRATOR DSS described so far in this application uses an orbital vibrator. The orbital vibrator works by rotating an eccentric (off center from the axis of rotation) mass that results in cyclical vibration. The frequency of the vibration is directly proportional to the speed of rotation, i.e., the number of rotations per second being equal to the frequency in Hz. The force of the vibration can be determined by the equation: $F=MR\omega^2$ where, F=the force generated, M=the mass of the eccentric mass, R=the distance from the center of the motor shaft to the eccentric mass and $\omega$=the angular velocity of the motor (i.e., speed of rotation).

Figure 16:
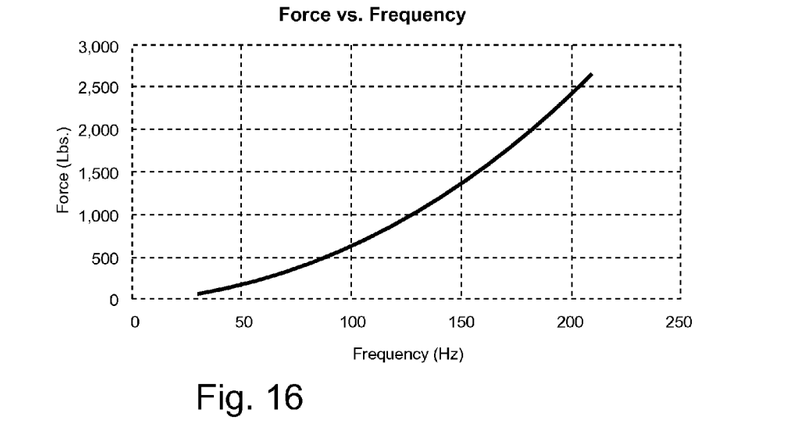
FIG. 16 is a chart which graphs force versus frequency for a typical orbital vibrator.

As can be seen from the equation, for a fixed eccentric mass and fixed offset of the mass from the center of the motor shaft, the force is proportional to the square of the speed. The chart in FIG. 18 depicts the force vs. frequency for a typical orbital vibrator.

Figure 17:
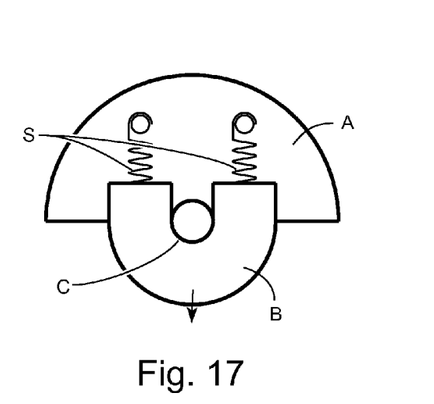
Figure 18:
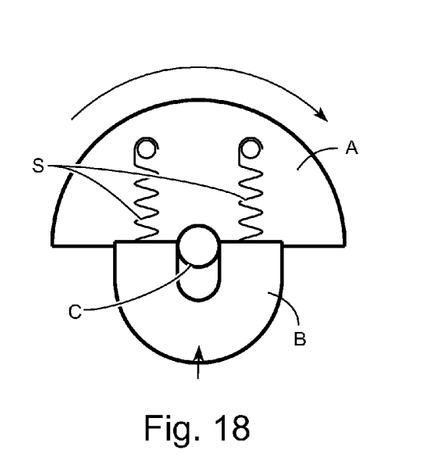
FIG. 18 illustrates a change of mass caused by rotation.

In some cases it may be desirable to have the force more constant with speed of rotation. In that case, one must dynamically change the eccentricity of the mass with speed of rotation. While there are many ways of achieving this, the preferred method is passively via the use of centrifugal force. The two simple drawings of FIGS. 17 and 18 provide a basic understanding of the invention. FIG. 17 represents the eccentric mass of an orbital vibrator at rest incorporating the current invention. There are actually two masses A and B and the combination of these two masses have a total combined eccentricity represented by the distance to the center of the combined masses to the center C of the motor shaft. In this case, mass A is firmly attached to the motor shaft and the mass B is moveable however it is being held in place by springs S while the motor is at rest. Both masses are designed to rotate with the motor shaft. As the motor starts to rotate (refer to FIG. 18) centrifugal force will tend to force the mass B away from the center of the motor shaft, providing more counterbalancing of the mass A, thus reducing the overall eccentricity. In other words, as the speed increases, centrifugal force acts against spring pressure to cause the weight B to move away from the shaft centerline decreasing the eccentricity/imbalance. In the preferred embodiment, since the mass of the weight B is less than that of the weight A, the system will never be completely balanced even at the maximum design operational speed of the drive motor. The amount of eccentricity of the combined masses at the top design speed of the drive motor will still be sufficient to provide the desired vibrational force. And, the spring force will be selected to provide the desired vibrational force vs. speed.

Additional Items:

1. Preferred means for achieving linear motion from two orbital vibrators. As disclosed previously, two orbital vibrators can be placed side by side and if the rotors are counter-rotating (see FIG. 13), the side forces cancel each other out and the resultant force is a linear motion only. Whereas the traditional method of achieving this linear motion is by placing two complete orbital vibrators (two individual motors with eccentric weights operating in synchrony) side by side, this is inefficient because it requires two separate drive motors and also synchronization between them is an added concern. Alternatively, a single drive motor can be used to drive two separate rotating shafts, each with eccentric weights attached. Gears or belt drives can be used to drive the two separate counter-rotating shafts from the single motor.

2. in addition to using the Distributed Seismic Source (ORBITAL VIBRATOR DSS) invention being used for downhole and marine seismic applications, it can also be applied to the land surface seismic application. Whereas the current method of applying vibrations to the surface of the earth for oilfield seismic applications is via the vibroseis truck described earlier, the ORBITAL VIBRATOR DSS technology can also be used to greatly improve upon this method. The vibroseis method utilizes hydraulics to oscillate a piston against a reaction mass to vibrate a plate held to the earth's surface. Two counter-rotating orbital vibrators as described previously to vibrate a plate held against the earth provides a much simpler method to impart seismic vibrations into the earth. While the most common mode of operation will be to vibrate the plate in an up and down motion against the earth's surface, sometimes it is desired to impart some side to side movement into the plate to impart shear waves into the earth. This can be performed by allowing a means to orient the axis of the vibrator away from normal to the plate/earth's surface.

While the invention has been described herein with reference to certain preferred embodiments, those embodiments have been presented by way of example only, and not to limit the scope of the invention. Additional embodiments thereof will be obvious to those skied in the art having the benefit of this detailed description.

Accordingly, it will be apparent to those skilled in the art that still further changes and modifications in the actual concepts described herein can readily be made without departing from the spirit and scope of the disclosed inventions.

What is claimed is:

1. An apparatus, comprising:
a plurality of seismic sources held within a linear array in a wellbore, wherein the plurality of seismic sources are electrically connected and are comprised of a plurality of orbital vibrators which have a primary acoustic radiation pattern which is orthogonal to the wellbore and wherein each of the plurality of seismic sources is secured within the wellbore with a plurality of low friction rollers; and
means for activating a radial clamping force for each of the plurality of seismic sources within the wellbore wherein the radial clamping force is activated by energizing the plurality of seismic sources.

2. The apparatus of claim 1 wherein the radial clamping force is a spring force that maintains the plurality of low friction rollers against sides of the wellbore.

3. A method, comprising:
inserting a plurality of seismic sources forming a linear array in a wellbore; permanently securing the plurality of seismic sources within the wellbore; and
using the plurality of seismic sources within the wellbore in conjunction with acoustic receivers for determining a lithology or acoustic imaging of a subsurface of the earth;
wherein the plurality of seismic sources are comprised of a plurality of orbital vibrators which have a primary acoustic radiation pattern which is orthogonal to the wellbore; and
wherein the plurality of seismic sources are permanently secured within the wellbore by cementing the inside of the wellbore and the plurality of seismic sources are energized during the cementing process to consolidate freshly placed concrete by helping entrapped air to escape.

4. The method of claim 3 further comprising providing a true, clean sinusoidal variable frequency signal to the plurality of orbital vibrators via use of an AC generator.

5. A method, comprising:
inserting a plurality of seismic sources forming a linear array in a wellbore wherein each of the plurality of seismic sources is secured within the wellbore with a plurality of low friction rollers;
activating a radial clamping force for each of the plurality of seismic sources within the wellbore;
using the plurality of seismic sources within the wellbore in conjunction with acoustic receivers for determining a lithology or acoustic imaging of a subsurface of the earth; and
retrieving the plurality of seismic sources from the wellbore;

wherein the plurality of seismic sources are comprised of a plurality of orbital vibrators which have a primary acoustic radiation pattern which is orthogonal to the wellbore; and wherein the radial clamping force is activated by energizing the plurality of seismic sources.

6. The method of claim 5 wherein the radial clamping force is a spring force that maintains the plurality of low friction rollers against sides of the wellbore.

7. The method of claim 5 further comprising providing a true, clean sinusoidal variable frequency signal to the plurality of orbital vibrators via use of an AC generator.

8. An apparatus, comprising:
a plurality of orbital vibrators held within a linear array in a wellbore;
at least one cable which electrically connects the plurality of orbital vibrators to a wellhead, said at least one cable being protected from a downhole environment in the wellbore;
a plurality of monitoring accelerometers; and
a plurality of source modules which house the plurality of orbital vibrators and the plurality of monitoring accelerometers, each of said plurality of source modules having an outside surface exposed to the downhole environment in the wellbore and an inside area protected from the downhole environment, each of said plurality of source modules housing both one of the plurality of orbital vibrators and one of the plurality of monitoring accelerometers within said inside area;
wherein each of the plurality of monitoring accelerometers sends a digital signal back to the wellhead which contains data about acoustic radiation output by said one of the plurality of orbital vibrators which is housed within one of the plurality of source modules with said each of the plurality of monitoring accelerometers.

9. The apparatus of claim 8 wherein the data includes data about the spectrum and amplitude of acoustic radiation output the seismic source.

* * * * *